United States Patent

Nishihara et al.

Patent Number: 5,772,704
Date of Patent: Jun. 30, 1998

[54] CYLINDRICAL BATTERY ASSEMBLING APPARATUS

[75] Inventors: Kouichi Nishihara, Moriguchi; Takeharu Nakanose, Katano; Katsuhisa Wadasaki; Seiichi Katou, both of Osaka, all of Japan

[73] Assignee: Matsushita Electric Industrial Co., Ltd., Japan

[21] Appl. No.: 762,151

[22] Filed: Dec. 9, 1996

[30] Foreign Application Priority Data

Dec. 15, 1995 [JP] Japan ................... 7-326725

[51] Int. Cl.[6] .................................................. B23P 19/00
[52] U.S. Cl. ................................. 29/730; 429/175
[58] Field of Search ........................ 29/730; 429/175

[56] References Cited

U.S. PATENT DOCUMENTS

5,036,581  8/1991  Ribordy et al. ................ 29/730

*Primary Examiner*—John S. Maples
*Attorney, Agent, or Firm*—Parkhurst & Wendel, L.L.P.

[57] ABSTRACT

A cylindrical guide sleeve has a larger-diameter portion formed at an upper portion thereof, a smaller-diameter portion formed at a lower portion thereof, and a tapered portion formed therebetween. The smaller-diameter portion has an inner diameter substantially identical with or slightly larger than an outer diameter of a cylindrical battery casing. A lower spindle supports a bottom surface of the cylindrical battery casing. An upper spindle pushes a seal plate downward along an inner surface of the cylindrical guide sleeve. In this case, the seal plate is inclined in a floating condition with respect to an axial direction of the cylindrical guide sleeve and connected via a lead to an electrode assembly accommodated in the cylindrical battery casing. A guide actuator shifts the cylindrical guide sleeve upward so as to surround the seal plate in the larger-diameter portion. An upper spindle actuator shifts the upper spindle downward to cause a spherical bottom surface of the upper spindle to push and guide the seal plate toward an upper opening of the cylindrical battery casing via the tapered portion.

6 Claims, 4 Drawing Sheets

CYLINDRICAL BATTERY ASSEMBLING APPARATUS

BACKGROUND OF THE INVENTION

1. Field of the Invention

The present invention relates to an assembling apparatus for assembling a seal plate which closes an opening of a cylindrical battery casing, preferably used for primary or secondary batteries such as nickel-cadmium batteries, nickel-hydrogen batteries, lithium batteries or the like.

2. Prior Art

A typical cylindrical battery has a cylindrical battery casing for accommodating a spiral electrode assembly therein, and a seal plate for closing an upper opening of this cylindrical battery casing. The seal plate is welded to a lead of a positive electrode extending from the spiral electrode assembly. When the seal plate is fixed to the predetermined position around the upper opening of the cylindrical battery casing, the seal plate serves as a cover for tightly closing the upper opening of the cylindrical battery as well as a positive electrode of the cylindrical battery.

FIGS. 5A through 5E illustrate sequential processes for assembling the seal plate to the cylindrical battery casing in accordance with a conventional manufacturing method.

In FIGS. 5A through 5E, for engaging or coupling a seal plate 2 with an opening 1a of a cylindrical battery casing 1, a cylindrical battery assembling apparatus comprises a cylindrical guide sleeve 16, upper and lower spindles 17 and 14 slidable along the inside cylindrical surface of guide sleeve 16, a guide actuator 56, and an upper spindle actuator 57.

Figure 5A:
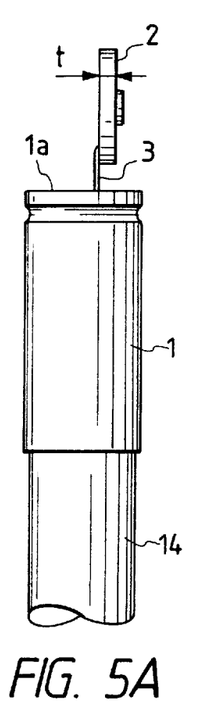
FIG. 5A is a front view showing a cylindrical battery casing having a seal plate and supported on the top of a lower spindle.

First of all, a pre-process prior to an assembling process of seal plate 2 will be explained. Seal plate 2 is welded, at the inside surface thereof, to a lead 3 extending from an electrode assembly accommodated in a cylindrical battery casing 1. Thus, seal plate 2 stands straight due to rigidity of lead 3 in a floating condition. Then, cylindrical battery casing 1 with seal plate 2 standing in the floating condition is mounted on the top of a lower spindle 14 (FIG. 5A).

Figure 5B:
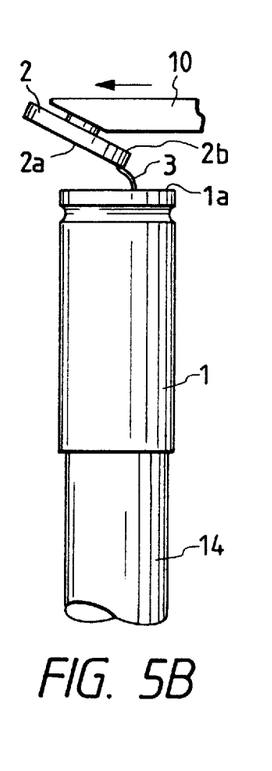
FIG. 5B is a front view showing a lead of the seal plate bent by a bending pin.

Next, a bending pin 10, having a slant lower surface at its front edge, is shifted toward an upper surface 2b of seal plate 2. Bending pin 10 pushes seal plate 2. With this pushing operation of bending pin 10, seal plate 2 is inclined from its vertical position and lead 3 is appropriately bent or deformed (FIG. 5B).

Figure 5C:
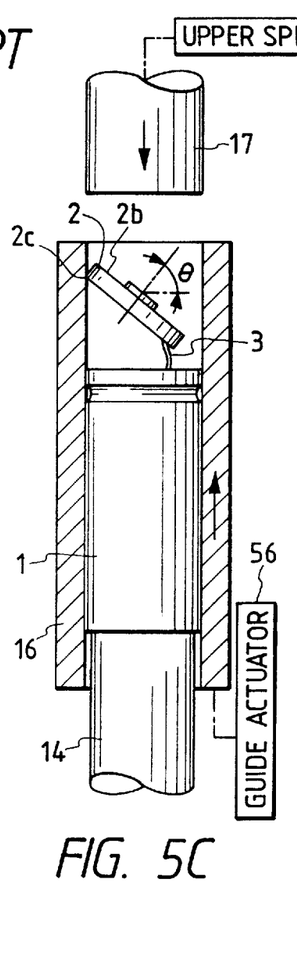
FIG. 5C is a cross-sectional view showing the seal plate accommodated in a guide sleeve and an upper spindle shifting toward the seal plate.

Next, the assembling process of seal plate 2 will be explained. Guide actuator 56 lifts guide sleeve 16 upward along the outer peripheral surface of lower spindle 14 from the lower part of lower spindle 14. The inner diameter of guide sleeve 16 is the same as an outer diameter of cylindrical battery casing 1. Seal plate 2, inclined due to bending or deformation of lead 3, is brought into contact with guide sleeve 16 at its outer peripheral edge 2c and slides along the inner cylindrical surface of guide sleeve 16. Guide actuator 56 stops the upward movement of guide sleeve 16 when guide sleeve 16 reached a predetermined height. In this condition, seal plate 2 is completely surrounded or housed in the inside space of guide sleeve 16. Then, upper spindle 17 positioned directly above seal plate 2 is lowered by actuating upper spindle actuator 57 (FIG. 5C).

Upper spindle 17 has a flat bottom surface 17a pushing seal plate 2 toward opening 1a of cylindrical battery casing 1. During pushing operation by upper spindle 17, seal plate 2 is guided by the inner cylindrical surface of guide sleeve 16, so that seal plate 2 is surely engaged or coupled with opening 1a of cylindrical battery casing 1 (FIG. 5D).

Figures 5D, 5E:
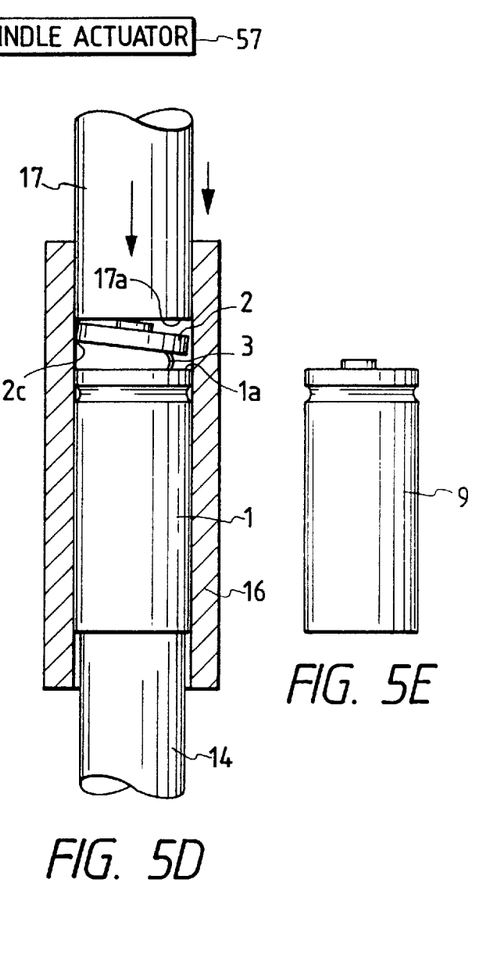
FIG. 5D is a cross-sectional view showing a lower movement of the upper spindle pushing and guiding the seal plate to the predetermined position around the opening of the cylindrical-battery casing.
FIG. 5E is a front view showing an assembled cylindrical battery.

Subsequently, the upper peripheral portion of cylindrical battery casing 1 is caulked to accomplish the assembling of seal plate 2, thereby obtaining a cylindrical battery 9 (FIG. 5E).

When lead 3 has a large rigidity, there is a possibility that seal plate 2 is not stably engaged or coupled with opening 1a of cylindrical battery casing 1. In such a case, the upper outer peripheral region of cylindrical battery casing 1 needs to be temporarily caulked under the condition where an appropriate pressing force is applied on upper surface 2b of seal plate 2. A main caulking operation is performed later for accomplishing the assembling operation of seal plate 2.

According to this conventional art, there are following problems.

An inclination angle $\theta$ of seal plate 2, shown in FIG. 5C, is virtually limited by the inner diameter of guide sleeve 16 irrespective of the bending or deformation angle of seal plate 2 by the bending pin 10. If the inclination angle $\theta$ is insufficient, there will be a possibility that seal plate 2 will cause undesirable rolling or inversion when upper surface 2b of seal plate 2 is pushed by flat bottom surface 17a of upper spindle 17. When seal plate 2 caused such rolling or inversion, it is no longer possible to guide seal plate 2 accurately to the predetermined position around opening 1a of cylindrical battery casing 1. This will lead to decline of productivity due to worse yield, necessity of correction of defective products and else.

Especially, most of advanced high-performance batteries include explosion-proof construction inside the seal plate 2. Thus, thickness t of seal plate 2 tends to be thicker than ever. The inclination angle $\theta$ reduces with increasing thickness t. When the inclination angle $\theta$ is further reduced due to increase of seal plate thickness t, it becomes more difficult to accurately guide seal plate 2 to opening 1a of cylindrical battery casing 1 along the inner cylindrical surface of guide sleeve 16.

SUMMARY OF THE INVENTION

Accordingly, in view of above-described problems encountered in the prior art, a principal object of the present invention is to provide a novel and excellent cylindrical battery assembling apparatus capable of effectively preventing undesirable rolling or inversion in the assembling operation of the seal plate.

In order to accomplish this and other related objects, a first aspect of the present invention provides a cylindrical battery assembling apparatus comprising a cylindrical guide sleeve, a lower spindle, an upper spindle, guide actuating means, and upper spindle actuating means.

According to the first aspect of the present invention, the cylindrical guide sleeve has a larger-diameter portion formed at an upper portion thereof, a smaller-diameter portion formed at a lower portion thereof, and a tapered portion formed between the larger-diameter portion and smaller-diameter portion. The smaller-diameter portion has an inner diameter substantially identical with or slightly larger than an outer diameter of a cylindrical battery casing.

The lower spindle supports a bottom surface of the cylindrical battery casing. The upper spindle pushes a seal plate downward along an inner surface of the cylindrical guide sleeve. In this case, the seal plate is inclined in a floating condition with respect to an axial direction of the cylindrical guide sleeve and connected via a lead to an electrode assembly accommodated in the cylindrical battery casing.

The guide actuating means shifts the cylindrical guide sleeve in an up-and-down direction. More specifically, the guide actuating means lifts the cylindrical guide sleeve upward along an outer surface of the lower spindle until the seal plate is surrounded by the larger-diameter portion and a lower end of the tapered portion reaches a predetermined level of an upper opening of the cylindrical battery casing.

And, upper spindle actuating means shifts the upper spindle in the up-and-down direction. That is, the upper spindle actuating means lowers the upper spindle along the larger-diameter portion to cause a bottom surface of the upper spindle to push and guide the seal plate toward the upper opening of the cylindrical battery casing via the tapered portion.

Furthermore, a second aspect of the present invention provides a cylindrical battery assembling apparatus comprising a cylindrical lower guide sleeve, a cylindrical upper guide sleeve, an upper spindle, a lower spindle, lower guide actuating means, upper guide actuating means, and upper spindle actuating means.

According to the second aspect of the present invention, the cylindrical lower guide sleeve comprises a smaller-diameter portion having an inner diameter substantially identical with or slightly larger than an outer diameter of a cylindrical battery casing. The cylindrical upper guide sleeve comprises a larger-diameter portion having an inner diameter larger than the inner diameter of the smaller-diameter portion.

The upper spindle is slidable in an up-and-down direction along an axial direction of the upper and lower guide sleeves for pushing a seal plate downward. In this case, the seal plate is inclined in a floating condition with respect to the axial direction of the upper and lower guide sleeves and connected via a lead to an electrode assembly accommodated in the cylindrical battery casing. The lower spindle supports a bottom surface of the cylindrical battery casing.

The lower guide actuating means shifts the lower guide sleeve in the up-and-down direction, in such a manner that the lower guide sleeve is lifted upward along an outer surface of the lower spindle until the seal plate is temporarily surrounded by the smaller-diameter portion. The upper guide actuating means shifts the upper guide sleeve in the up-and-down direction coaxially with the lower guide sleeve, in such a manner that the upper guide sleeve is lowered until the upper guide sleeve is substantially united with the lower guide sleeve. Then, the upper guide actuating means and the lower guide actuating means cooperatively lower the upper guide sleeve and the lower guide sleeve integrally until the seal plate is transferred from the smaller-diameter portion of the lower guide sleeve to the larger-diameter portion of the upper guide sleeve and a lower end of the tapered portion reaches a predetermined level of an upper opening of the cylindrical battery casing.

And, the upper spindle actuating means shifts the upper spindle in the up-and-down direction. More specifically, the upper spindle actuating means lowers the upper spindle along the larger-diameter portion to cause a bottom surface of the upper spindle to push and guide the seal plate toward the upper opening of the cylindrical battery casing via the tapered portion.

According to the features of preferred embodiment of the present invention, it is preferable that the bottom surface of the upper spindle protrudes downward at a central region thereof compared with an outer peripheral region thereof. Still further, it is preferable that appropriate attracting means is provided on a top of the lower spindle for holding the cylindrical battery casing.

BRIEF DESCRIPTION OF THE DRAWINGS

The above and other objects, features and advantages of the present invention will become more apparent from the following detailed description which is to be read in conjunction with the accompanying drawings, in which:

FIGS. 1A through 1D are views illustrating sequential processes for assembling a seal plate to a predetermined position around an opening of a cylindrical battery casing in accordance with a first embodiment of the present invention, wherein

FIGS. 2A through 2E are views illustrating sequential processes for assembling a seal plate to a predetermined position around an opening of a cylindrical battery casing in accordance with a second embodiment of the present invention, wherein

FIGS. 5A through 5E are views illustrating a conventional method for assembling a seal plate to a predetermined position around an opening of a cylindrical battery casing, wherein

DETAILED DESCRIPTION OF THE PREFERRED EMBODIMENTS

Preferred embodiments of the present invention will be explained in greater detail hereinafter with reference to the accompanying drawings. Identical parts are denoted by the same reference numerals throughout the views.

Figures 1A, 1B:
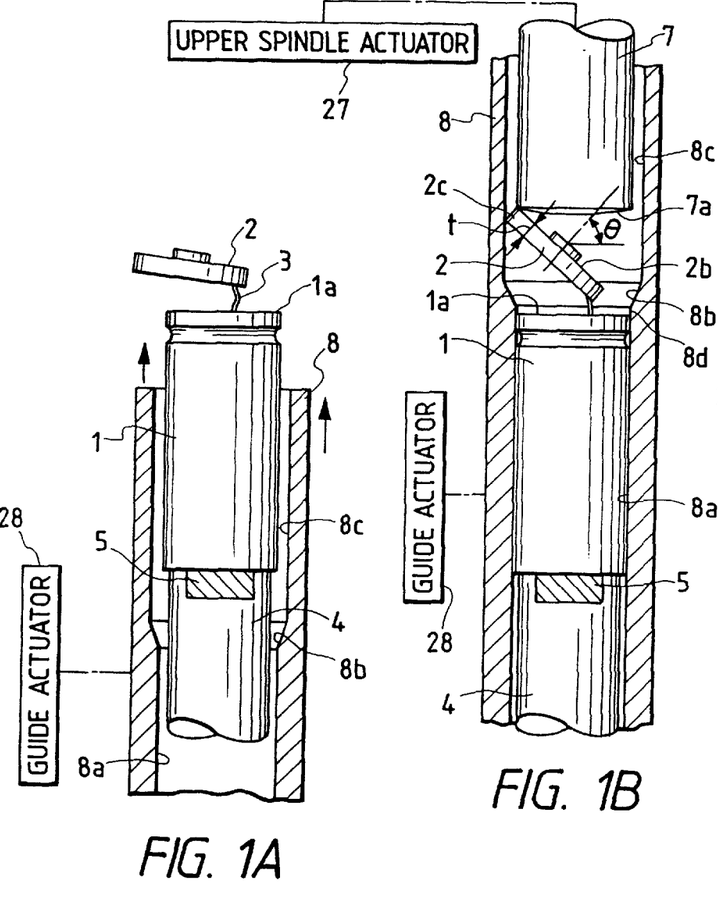
FIG. 1A is a cross-sectional view showing an upper movement of a guide sleeve shifting along an outer peripheral surface of a lower spindle from the lower portion of this lower spindle.
FIG. 1B is a cross-sectional view showing an engagement between an upper spindle and the seal plate where the bottom surface of the upper spindle is brought into contact with the upper surface of the seal plate.

A cylindrical battery assembling apparatus in accordance with a first embodiment of the present invention will be explained. The cylindrical battery assembling apparatus of the first embodiment comprises a guide sleeve 8, an upper spindle 7, a lower spindle 4, a guide actuator 28 shifting the guide sleeve 8 in the up-and-down direction, and an upper spindle actuator 27 shifting the upper spindle 7 in the up-and-down direction.

The lower spindle 4 has a cylindrical body whose outer diameter is slightly smaller than the outer diameter of a cylindrical battery casing 1. A magnet 5, serving as attracting means for holding the bottom of the cylindrical battery casing 1, is provided on the top surface of the lower spindle 4.

Figure 4:
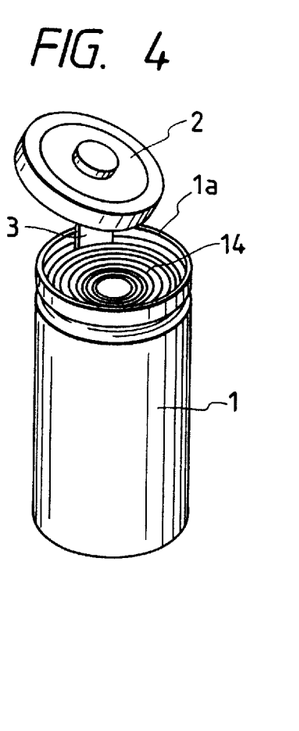
FIG. 4 is a perspective view showing the details of the cylindrical battery casing.

The cylindrical battery casing 1, as shown in FIG. 4, accommodates a spiral electrode assembly 14 in a cylindrical hollow space thereof and has an opening 1a at the upper end thereof. The opening 1a of cylindrical battery casing 1 is covered by a seal plate 2. The seal plate 2, serving as positive electrode, is welded to a lead 3 at the inside portion thereof, and electrically connected with the electrode assembly 14.

Immediately after the seal plate 2 is welded to lead 3, the seal plate 2 stands straight with respect to the cylindrical battery casing 1 as an initial condition. In the pre-process for engaging or coupling the seal plate 2 with the opening 1a of cylindrical battery casing 1, the lead 3 is bent or deformed by a bending pin 10 and held at a stationary condition where the seal plate 2 is inclined at an appropriate angle with respect to the vertical line (i.e. axial direction of cylindrical battery casing 1 or guide sleeve 8) in the same manner as in the above-described conventional assembling method.

Guide sleeve 8 is a cylindrical sleeve having a plurality of cylindrical inside surfaces sequentially arranged along the axial direction and different in their diameters. More specifically, the cylindrical inside surface of the guide sleeve 8 is constituted by a smaller-diameter portion 8a formed at its lower portion, a larger-diameter portion 8c formed at its upper portion, and a tapered portion 8b continuously or smoothly connecting the smaller-diameter portion 8a and the larger-diameter portion 8c. The smaller-diameter portion 8a has an inner diameter slightly larger than the outer diameter of the cylindrical battery casing 1. The larger-diameter portion 8c has an inner diameter larger than the inner diameter of the smaller-diameter portion 8a.

The smaller-diameter portion 8a and the lower spindle 4 cooperatively hold or support the cylindrical battery casing 1 when the seal plate 2 is engaged with the opening 1a. The larger-diameter portion 8c houses or surrounds the seal plate 2 therein and guides the seal plate 2 toward the opening 1a of cylindrical battery casing 1.

The upper spindle 7 has a cylindrical body whose outer diameter is smaller than the inner diameter of the larger-diameter portion 8c of guide sleeve 8. A protrusion having a spherical surface is formed at the bottom surface 7a of upper spindle 7. In other words, the bottom surface 7a of upper spindle 7 protrudes downward at a central region thereof compared with an outer peripheral region thereof. The guide sleeve 8 and upper spindle 7 are shifted in the up-and-down direction by guide actuator 28 and upper spindle actuator 27 respectively. According to this embodiment, these actuators 27 and 28 can be constituted by using a cam driving mechanism or a motor driving mechanism.

Next, sequential processes for engaging the seal plate 2 with the opening 1a of cylindrical battery casing 1 will be explained with reference to FIGS. 1A through 1D.

As shown in FIG. 1A, the guide actuator 28 lifts the guide sleeve 8 upward along an outer peripheral surface of lower spindle 4 from the lower portion of lower spindle 4. The larger-diameter portion 8c of guide sleeve 8 surrounds the cylindrical battery casing 1 held on the top surface of lower spindle 4. An outer peripheral edge 2c of seal plate 2 begins sliding along the larger-diameter portion 8c after the guide sleeve 8 reached the height of seal plate 2 and surrounded the seal plate 2 in the inside space of the larger-diameter portion 8c.

As shown in FIG. 1B, the guide actuator 28 stops the upward movement of guide sleeve 8 as soon as the lower end 8d of tapered portion 8b (i.e. the upper end of smaller-diameter portion 8a) reached the level of opening 1a of cylindrical battery casing 1. Then, the upper spindle actuator 27 lowers the upper spindle 7 along the axis of larger-diameter portion 8c. Thus, the spherical bottom surface 7a of upper spindle 7 is brought into contact with upper surface 2b of seal plate 2.

In this condition, an inclination angle θ of seal plate 2 is fairly enlarged due to the enlarged diameter of larger-diameter portion 8c. In FIG. 1B, inclination angle θ is defined as an angle between a normal of seal plate 2 and a horizontal plane. In other words, the inclination angle θ is equal to the angle between the vertical line (i.e. axial direction of guide sleeve 8 or cylindrical battery casing 1) and the upper surface 2b of seal plate 2. Thus, the upper surface 2b of seal plate 2 is properly and smoothly brought into contact with the bottom surface 7a of upper spindle 7, effectively preventing the seal plate 2 from causing rolling or inversion when upper spindle 7 is lowered. Occurrence of undesirable rolling or inversion of seal plate 2 can be reduced with increasing inclination angle θ. According to the present invention, the inner diameter of larger-diameter portion 8c is enlarged by 10–15% compared with that of smaller-diameter portion 8a, so as to realize both of compactness of apparatus and increase of inclination angle θ.

Furthermore, the spherical bottom surface 7a of upper spindle 7 enhances the above-described effect.

Still further, according to the first embodiment of the present invention, the diameter of larger-diameter portion 8c can be adequately adjusted in accordance with the thickness t of seal plate 2, so that any thick cylindrical battery can be smoothly assembled according to the method of the present invention.

Figure 1C:
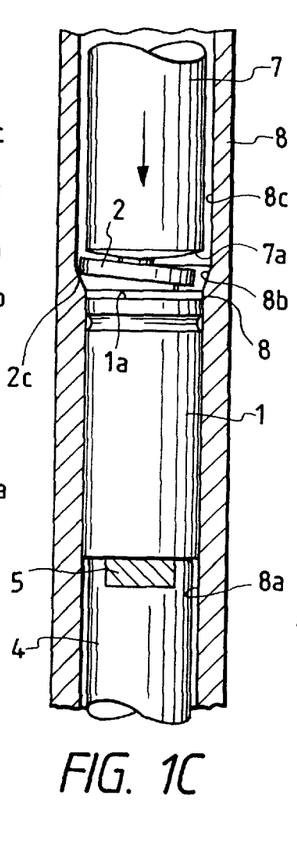
FIG. 1C is a cross-sectional view showing a lower movement of the upper spindle pushing and guiding the seal plate toward the opening of the cylindrical battery casing.
Figure 1D:
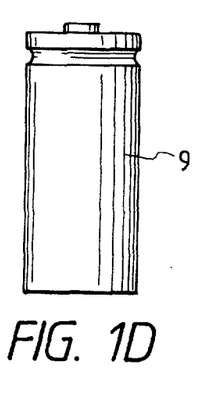
FIG. 1D is a front view showing an assembled cylindrical battery.

As shown in FIG. 1C, when the upper spindle 7 is further lowered, the outer peripheral edge 2c of seal plate 2 slides continuously in the vertical direction along the surface of larger-diameter portion 8c and the slope of tapered portion 8b. Thus, the seal plate 2 is accurately guided to the opening 1a of cylindrical battery casing 1. At the lower end of the limited stroke of upper spindle 7, seal plate 2 is engaged or coupled with opening 1a of cylindrical battery casing 1. Thereafter, the outer peripheral portion of the upper end of cylindrical battery casing 1 is caulked to complete the assembling of seal plate 2, thereby obtaining a cylindrical battery 9 as shown in FIG. 1D.

As explained above, the first embodiment of the present invention provides a cylindrical battery assembling apparatus comprising a cylindrical guide sleeve, a lower spindle, an upper spindle, guide actuating means, and upper spindle actuating means.

More specifically, the cylindrical guide sleeve has a larger-diameter portion formed at an upper portion thereof, a smaller-diameter portion formed at a lower portion thereof, and a tapered portion formed between the larger-diameter portion and smaller-diameter portion. The smaller-diameter portion has an inner diameter substantially identical with or slightly larger than an outer diameter of a cylindrical battery casing.

The lower spindle supports a bottom surface of the cylindrical battery casing. The upper spindle pushes a seal plate downward along an inner surface of the cylindrical guide sleeve. In this case, the seal plate is inclined in a floating condition with respect to an axial direction of the cylindrical guide sleeve and connected via a lead to an electrode assembly accommodated in the cylindrical battery casing.

The guide actuating means shifts the cylindrical guide sleeve in an up-and-down direction. More specifically, the guide actuating means lifts the cylindrical guide sleeve upward along an outer surface of the lower spindle until the seal plate is surrounded by the larger-diameter portion and a lower end of the tapered portion reaches a predetermined level of an upper opening of the cylindrical battery casing.

And, upper spindle actuating means shifts the upper spindle in the up-and-down direction. That is, the upper spindle actuating means lowers the upper spindle along the larger-diameter portion to cause a bottom surface of the upper spindle to push and guide the seal plate toward the upper opening of the cylindrical battery casing via the tapered portion.

Next, a second embodiment of the present invention will be explained with reference to FIGS. 2A through 2E.

Figures 2A, 2B:
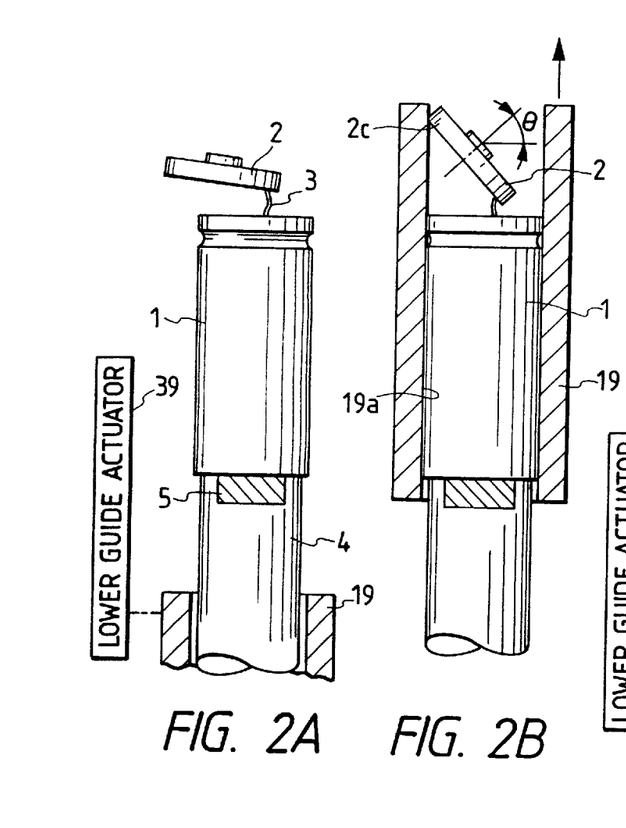
FIG. 2A is a cross-sectional view showing an upper movement of a lower guide sleeve shifting along an outer peripheral surface of a lower spindle from the lower portion of this lower spindle.
FIG. 2B is a cross-sectional view showing a seal plate accommodated in the inside space of a smaller-diameter portion of the lower guide sleeve.

The cylindrical battery assembling apparatus of the second embodiment is different from the above-described cylindrical battery assembling apparatus of the first embodiment in that the guide sleeve 8 of the first embodiment is separated into an upper guide sleeve 18 and a lower guide sleeve 19 which are independently shifted by upper guide actuator 38 and lower guide actuator 39, respectively.

The lower guide sleeve 19 is a cylindrical sleeve having a smaller-diameter portion 19a whose inner diameter is slightly larger than the outer diameter of cylindrical battery casing 1. The upper guide sleeve 18 is a cylindrical sleeve having a larger-diameter portion 18c formed at its upper portion and a tapered portion 18b formed at its lower portion. The larger-diameter portion 18c has an inner diameter larger than the inner diameter of smaller-diameter portion 19a of lower guide sleeve 19. The tapered portion 18b is integrally formed with the larger-diameter portion 18c so that larger-diameter portion 18c of upper guide sleeve 18 is continuously and smoothly connected to smaller-diameter portion 19a of lower guide sleeve 19.

The upper guide actuator 38 and lower guide actuator 39 can be constituted by using a cam driving mechanism or a motor driving mechanism. Other arrangement of the second embodiment is substantially the same as that of the first embodiment.

Next, sequential processes for engaging the seal plate 2 with the opening 1a of cylindrical battery casing 1 will be explained with reference to FIGS. 2A through 2E.

As shown in FIG. 2A, the lower guide actuator 39 lifts the lower guide sleeve 19 upward along an outer peripheral surface of lower spindle 4 from the lower portion of lower spindle 4 which holds the cylindrical battery casing 1 at its top surface by the attraction force of magnet 5. Then, as shown in FIG. 2B, the outer peripheral edge 2c of seal plate 2 begins sliding along the smaller-diameter portion 19 after the lower guide sleeve 19 reached the height of seal plate 2. And then, lower guide actuator 39 stops the upward movement of lower guide sleeve 19 at the condition where the seal plate 2 is temporarily surrounded or housed in the inside space of the smaller-diameter portion 19a.

Figure 2C:
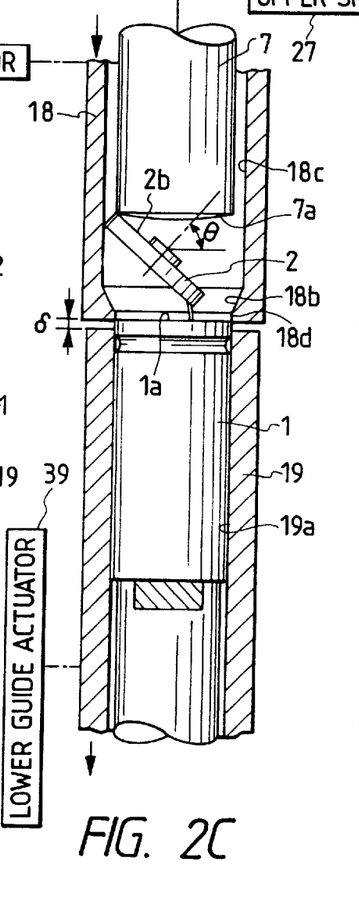
FIG. 2C is a cross-sectional view showing a lower movement of an upper guide sleeve and an engagement between the upper spindle and the seal plate where the bottom surface of the upper spindle is brought into contact with the upper surface of the seal plate.

Then, as shown in FIG. 2C, the upper guide actuator 38 lowers the upper guide sleeve 18 until the lower end of upper guide sleeve 18 confronts coaxially with the upper end of lower guide sleeve 19 with a tiny gap δ (δ can be 0). Then, the upper guide actuator 38 and lower guide actuator 39 cooperatively control the shift movement of upper guide sleeve 18 and the lower guide sleeve 19 so that these guide sleeves 18 and 19 are integrally lowered at the same speed. Through this cooperative downward shift movement, the seal plate 2 housed in the inside space of smaller-diameter portion 19a of lower guide sleeve 19 is smoothly transferred to the inside space of larger-diameter portion 18c of upper guide sleeve 18 via the tapered portion 18b formed at the lower end of upper guide sleeve 18.

The upper guide actuator 38 and lower guide actuator 39 stop the downward movement of upper guide sleeve 18 and lower guide sleeve 19 when a lower end 18d of tapered portion 18b reached the level of opening 1a of cylindrical battery casing 1. Then, the upper spindle actuator 27 lowers the upper spindle 7 along the axis of larger-diameter portion 18c of upper guide sleeve 18 so that the spherical bottom surface 7a of upper spindle 7 is brought into contact with the upper surface 2b of seal plate 2.

Figure 2D:
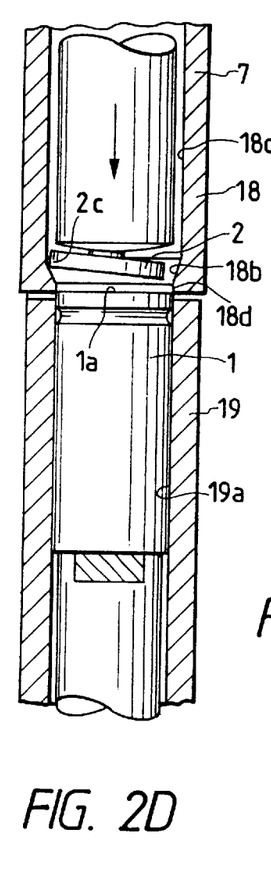
FIG. 2D is a cross-sectional view showing a lower movement of the upper spindle pushing and guiding the seal plate to a predetermined position around the opening of the cylindrical battery casing.
Figure 2E:
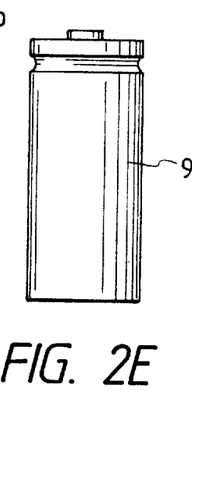
FIG. 2E is a front view showing an assembled cylindrical battery.

Then, as shown in FIG. 2D, when the upper spindle 7 is further lowered, the outer peripheral edge 2c of seal plate 2 slides continuously in the vertical direction along the surface of larger-diameter portion 18c and the slope of tapered portion 18b. Accordingly, the seal plate 2 is accurately guided to the opening 1a of cylindrical battery casing 1. Then, at the lower end of the limited stroke of upper spindle 7, seal plate 2 is engaged or coupled with opening 1a of cylindrical battery casing 1. Thereafter, the outer peripheral portion of the upper end of cylindrical battery casing 1 is caulked to complete the assembling of seal plate 2, thereby obtaining a cylindrical battery 9 as shown in FIG. 2E.

According to the second embodiment of the present invention, an assembled cylindrical battery 9 can be easily and promptly taken out by opening the space between the separated guide sleeves 18 and 19 after completing the assembling operation of seal plate 2. This is advantageous in caulking the upper outer peripheral portion of cylindrical battery casing 1 in the next manufacturing step, thereby improving the productivity of cylindrical batteries.

As explained above, the second embodiment of the present invention provides a cylindrical battery assembling apparatus comprising a cylindrical lower guide sleeve, a cylindrical upper guide sleeve, an upper spindle, a lower spindle, lower guide actuating means, upper guide actuating means, and upper spindle actuating means.

More specifically, the cylindrical lower guide sleeve comprises a smaller-diameter portion having an inner diameter substantially identical with or slightly larger than an outer diameter of a cylindrical battery casing. The cylindrical upper guide sleeve comprises a larger-diameter portion having an inner diameter larger than the inner diameter of the smaller-diameter portion.

The upper spindle is slidable in an up-and-down direction along an axial direction of the upper and lower guide sleeves for pushing a seal plate downward. In this case, the seal plate is inclined in a floating condition with respect to the axial direction of the upper and lower guide sleeves and connected via a lead to an electrode assembly accommodated in the cylindrical battery casing. The lower spindle supports a bottom surface of the cylindrical battery casing.

The lower guide actuating means shifts the lower guide sleeve in the up-and-down direction, in such a manner that the lower guide sleeve is lifted upward along an outer surface of the lower spindle until the seal plate is temporarily surrounded by the smaller-diameter portion. The upper guide actuating means shifts the upper guide sleeve in the up-and-down direction coaxially with the lower guide sleeve, in such a manner that the upper guide sleeve is lowered until the upper guide sleeve is substantially united with the lower guide sleeve. Then, the upper guide actuating means and the lower guide actuating means cooperatively lower the upper guide sleeve and the lower guide sleeve integrally until the seal plate is transferred from the smaller-diameter portion of the lower guide sleeve to the larger-diameter portion of the upper guide sleeve and a lower end of the tapered portion reaches a predetermined level of an upper opening of the cylindrical battery casing.

And, the upper spindle actuating means shifts the upper spindle in the up-and-down direction. More specifically, the upper spindle actuating means lowers the upper spindle along the larger-diameter portion to cause a bottom surface of the upper spindle to push and guide the seal plate toward the upper opening of the cylindrical battery casing via the tapered portion.

Figure 3:
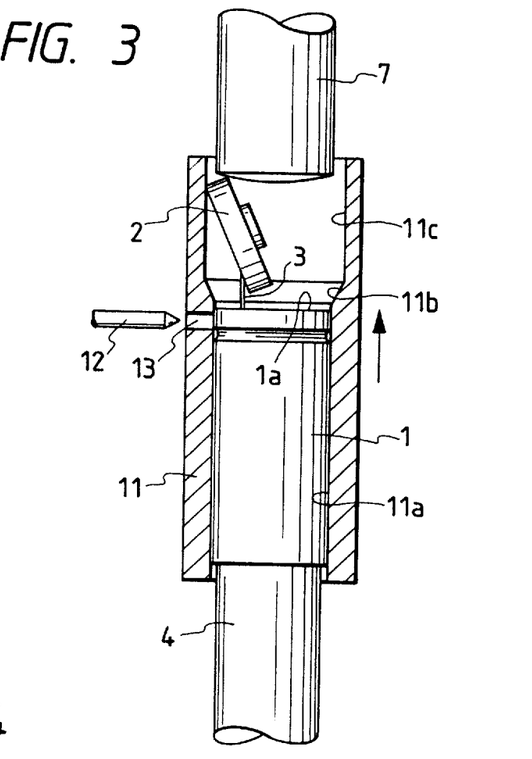
FIG. 3 is a cross-sectional view showing a third embodiment of the present invention.

A third embodiment of the present invention will be explained with reference to FIG. 3. The third embodiment is a modification of the first embodiment, and is different from the first embodiment in that a guide sleeve 11 of the third embodiment has a pin hole 13 formed at the portion below the tapered portion 11b smoothly connecting surfaces of smaller-diameter portion 11a and larger-diameter portion 11c. A pin 12 is inserted in the pin hole 13 by an actuator (not shown).

The pin 12 is used to apply a temporary caulking to the upper outer peripheral portion of the cylindrical battery casing 1 after the seal plate 2 is engaged or coupled with the opening 1a of cylindrical battery casing 1. More specifically, by actuation of the actuator (not shown), pin 12 is pushed inward through the pin hole 13 of guide sleeve 11 to caulk the upper peripheral portion of cylindrical battery casing 1 temporarily, and is then returned to the original or home position.

In this manner, by performing the temporary caulking operation after finishing the assembling of seal plate 2, the seal plate 2 is effectively prevented from hopping off the position of opening 1a due to springback of lead 3. Furthermore, the temporary caulking of the third embodiment can be performed in the same manufacturing process as assembling of the seal plate 2. Therefore, the productivity can be improved more. Especially, the third embodiment of the present invention can provide an effective cylindrical battery assembling apparatus when the lead 3 has a large rigidity.

Next, a fourth embodiment of the present invention will be explained. Although not shown in the drawing, the fourth embodiment is different from the first embodiment in that the guide sleeve 8 is split into a plurality of elements along a plurality of vertical split lines. These split elements are selectively engaged or disengaged at a predetermined position of cylindrical battery casing 1 by means of an adequate fastening means, such as collet chuck. When the split elements are engaged or united, the guide sleeve 8 has the same configuration as that shown in FIGS. 1B or 1C. Thus, the assembling operation of seal plate 2 can be performed in the same manner as in the first embodiment. When the split elements are disengaged or separated from each other, the inner diameter of guide sleeve 8 is enlarged largely, so that an assembled cylindrical battery can be easily taken out.

As explained in the foregoing description, the present invention provides the guide sleeve having a larger-diameter portion for accommodating the seal plate therein. Thus, the inclination angle of the seal plate can be increased sufficiently, so that the seal plate can be smoothly engaged or coupled with the opening of the cylindrical battery casing when the seal plate is pushed by the upper spindle, without causing rolling or inversion of the seal plate. Thus, the productivity and yield in the manufacturing can be effectively improved.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A cylindrical battery assembling apparatus comprising:
a cylindrical guide sleeve having a larger-diameter portion formed at an upper portion thereof, a smaller-diameter portion formed at a lower portion thereof, and a tapered portion formed between said larger-diameter portion and smaller-diameter portion, said smaller-diameter portion has an inner diameter substantially identical with or slightly larger than an outer diameter of a cylindrical battery casing;
a lower spindle supporting a bottom surface of said cylindrical battery casing;
an upper spindle pushing a seal plate downward along an inner surface of said cylindrical guide sleeve, said seal plate being inclined in a floating condition with respect to an axial direction of said cylindrical guide sleeve and connected via a lead to an electrode assembly accommodated in said cylindrical battery casing;
guide actuating means for shifting said cylindrical guide sleeve in an up-and-down direction, said guide actuating means lifting said cylindrical guide sleeve upward along an outer surface of said lower spindle until said seal plate is surrounded by said larger-diameter portion and a lower end of said tapered portion reaches a position above an upper opening of said cylindrical battery casing; and
upper spindle actuating means for shifting said upper spindle in the up-and-down direction, said upper spindle actuating means lowering said upper spindle along said larger-diameter portion to cause a bottom surface of said upper spindle to push and guide said seal plate toward said upper opening of said cylindrical battery casing via said tapered portion.

2. The cylindrical battery assembling apparatus in accordance with claim 1, wherein said bottom surface of said upper spindle protrudes downward at a central region thereof compared with an outer peripheral region thereof.

3. The cylindrical battery assembling apparatus in accordance with claim 1, wherein attracting means is provided on a top of said lower spindle for holding said cylindrical battery casing.

4. A cylindrical battery assembling apparatus comprising:
a cylindrical lower guide sleeve with a smaller-diameter portion having an inner diameter substantially identical with or slightly larger than an outer diameter of a cylindrical battery casing;
a cylindrical upper guide sleeve with a larger-diameter portion and a tapered portion; the larger-diameter portion having an inner diameter larger than said inner diameter of said smaller-diameter portion;

an upper spindle slidable in an up-and-down direction along an axial direction of said upper and lower guide sleeves for pushing a seal plate downward, said seal plate being inclined in a floating condition with respect to the axial direction of said upper and lower guide sleeves and connected via a lead to an electrode assembly accommodated in said cylindrical battery casing;

a lower spindle supporting a bottom surface of said cylindrical battery casing;

lower guide actuating means for shifting said lower guide sleeve in the up-and-down direction, said lower guide actuating means lifting said lower guide sleeve upward along an outer surface of said lower spindle until said seal plate is temporarily surrounded by said smaller-diameter portion;

upper guide actuating means for shifting said upper guide sleeve in the up-and-down direction coaxially with said lower guide sleeve, said upper guide actuating means lowering said upper guide sleeve until said supper guide sleeve is substantially united with said lower guide sleeve;

said upper guide actuating means and said lower guide actuating means cooperatively lowering said upper guide sleeve and said lower guide sleeve integrally until said seal plate is transferred from said smaller-diameter portion of said lower guide sleeve to said larger-diameter portion of said upper guide sleeve and a lower end of said tapered portion reaches a position above an upper opening of said cylindrical battery casing; and upper spindle actuating means for shifting said upper spindle in the up-and-down direction, said upper spindle actuating means lowering said upper spindle along said larger-diameter portion to cause a bottom surface of said upper spindle to push and guide said seal plate toward said upper opening of said cylindrical battery casing via said tapered portion.

5. The cylindrical battery assembling apparatus in accordance with claim 4, wherein said bottom surface of said upper spindle protrudes downward at a central region thereof compared with an outer peripheral region thereof.

6. The cylindrical battery assembling apparatus in accordance with claim 4, wherein attracting means is provided on a top of said lower spindle for holding said cylindrical battery casing.

* * * * *